Dec. 22, 1931.  LE ROY C. SCHENCK  1,837,838
ANTIFRICTION SPLINE
Filed Sept. 17, 1929
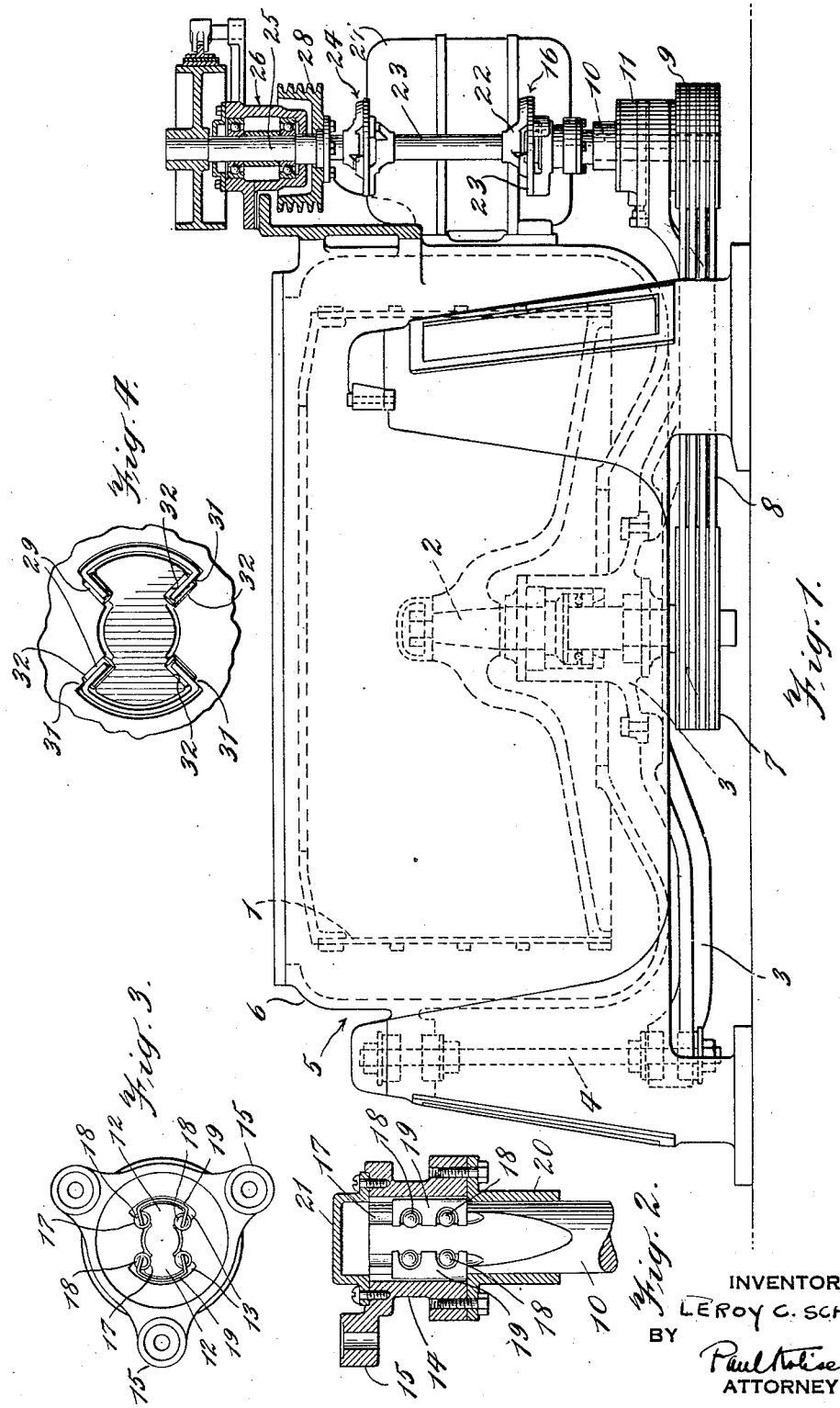
INVENTOR:
LEROY C. SCHENCK
BY
Paul Notisch
ATTORNEY Patented Dec. 22, 1931

1,837,838

UNITED STATES PATENT OFFICE

LE ROY C. SCHENCK, OF MOLINE, ILLINOIS, ASSIGNOR TO TROY LAUNDRY MACHINERY COMPANY, INC., OF NEW YORK, N. Y., A CORPORATION OF DELAWARE

ANTIFRICTION SPLINE

Application filed September 17, 1929. Serial No. 393,204.

This invention relates to centrifugal extractors or other rotary machinery of a similar nature.

It is an object of this invention to provide an improved form of driving mechanism for use in connection with rotatable elements which are suspended for free oscillatory movement.

More specifically it is an object to provide an extremely flexible driving connection between a stationary motor means and a freely swingable rotatable element.

A further object is the design of an extensible shaft which is adapted to transmit torque while presenting a minimum of resistance to extension or contraction.

In accordance with my invention, which I have described in connection with a centrifugal extractor of the type forming the subject matter of my co-pending application #339,346, filed February 4, 1929, I provide for driving an oscillatably suspended rotatable element, a stationary driving motor. This motor is coupled, through an extensible splined shaft furnished with universal joints, to a driving element movable with said rotatable element. In order to permit oscillation of said rotatable element with a minimum of friction the forementioned universal joints are made flexible longitudinally and the splined shaft is provided with anti-friction bearing elements. These anti-friction elements may be of either the ball bearing or roller bearing type.

In operation any end thrust upon the shaft is taken care of by flexure of the universal joints or by extension or contraction of the splined shaft.

The objects and advantages of the invention and the manner of attaining them will be made clear in the following description and accompanying drawings, in which:

Fig. 1 is an elevation view, partly in section, of a laundry extractor constructed in accordance with my invention.

Fig. 2 is an enlarged sectional view of the extensible shaft arrangement of the driving mechanism.

Fig. 3 is a section view taken along lines 3—3 of Fig. 1.

Fig. 4 is a similar sectional view showing a modified form of construction.

In the drawings reference numeral 1 indicates a basket carried by a rotatable shaft 2 journaled in a bearing plate 3 which is swingably supported by suspension links 4 from a stationary curb or frame 5. This frame comprises in part a housing 6 which enclosed the basket.

The shaft 2 carries at its lower end a pulley 7 which is connected by belts 8 with a driving pulley 9 secured to one end of a stub shaft 10 journaled in a bearing portion 11 forming part of the bearing plate 3. The other end of the shaft is shaped to provide two splines or feathers 12 which are adapted to fit in corresponding keyways 13 in a sleeve 14 having a spider portion 15 which forms part of a universal joint 16.

Both the splines 12 and keyways 13 are provided with cooperating raceways 17 which are provided with a series of balls 18. These balls are of just the right size to keep the shaft 10 properly centered in the sleeve 14 without excessive lost motion. In order to maintain the proper separation between these balls a retainer 19 may be utilized. This retainer may be made of sheet metal bent in the shape of a U and furnished with semi-circular notches in the edges thereof, which serve to accommodate the balls.

A sleeve 20 secured to the sleeve 14 serves to maintain the shaft 10 in proper alignment. A cap 21 is secured to the top of sleeve 14 for protecting the working parts from dust. In Fig. 3 the mechanism is shown with this cover removed.

The spider 15 forms, in cooperation with a like spider 22 and a flexible fabric disc 23 a conventional flexible universal joint 16 of the type sold under the trade name Thermoid Hardy. By means of a shaft 23 the universal 16 is connected to a similar universal 24, which is in turn joined to a driving shaft 25 journaled in a stationary bearing member 26 supported by the curb 5. This shaft may be driven by a motor 27 fastened to the curb, through belts, not shown, engaging with pulley 28 keyed to shaft 25.

The modified form of anti-friction arrangement shown in Fig. 4 differs from that of Fig. 3 only in that the anti-friction elements are rollers 29, instead of balls. A retainer 30 similar to 19 is used to space the rollers properly. This retainer is held in the proper position by engagement with shoulders 31 projecting inwardly from the race 32, but may be arranged as in Fig. 3 wherein the retainer 19 is made of such dimensions as to be prevented from excessive movement by engagement with the edges of the splines or feathers 12.

In operation when the basket 1 is rotated at high speed with an unbalanced load oscillation thereof occurs which is permitted by virtue of the suspension links 4 that hold up the bearing plate 3. Oscillation of the bearing plate, which carries shaft 10, causes similar oscillation of shaft 23. This oscillation is taken care of, in part, by the flexible universal joints 16 and 24, the discs of which are adapted to bend back and forth as necessary. Where strong oscillations occur the ball bearing splined shaft shortens and lengthens slightly thereby preventing vibrations from being transferred from the basket or bearing plate to the curb and main support in general.

The use of the anti-friction spline for the shaft 10 results in a very efficient and quiet running machine, which operates with a minimum of vibration.

Where the amplitude of oscillation of the basket is slight, due to a small amount of unbalance in the load carried thereby, the flexible universal joints alone may be used, but where vibration is vigorous a splined shaft should be used. The conventional extensible shaft may be used but is not free enough of friction for best results to be secured. Where the driving torque is heavy the friction between the two parts of the extensible shaft is great enough to prevent proper extension and contraction of the shaft. The result, in such a case, is the transmission of a large amount of vibration to the frame and support of the machine. Such deleterious effects are prevented by the use of an anti-friction extensible shaft, in accordance with the present invention. The rolling bearing elements permit the transmission of a heavy driving torque while at the same time maintaining friction low between the extensible portions of the shaft, the result being that the basket and bearing plate are permitted freely to oscillate.

What I claim is:

1. In combination, a base member supported for oscillatory movement, a first shaft carried by said member, a second shaft supported independently of said member and means for interconnecting said shafts comprising two universal joints, a shaft slidably keyed to one of said other shafts and rolling means for preventing friction between the two slidably keyed shafts.

2. In a centrifugal extractor, a supporting member mounted for oscillatory movement, a shaft rotatably supported thereby, a rotatable shaft mounted on a fixed member and means for coupling said shafts comprising interconnected universal joints, means forming part of one of said universal joints slidably keyed to one of said shafts, and anti-friction means for insuring easy relative endwise movement of said slidably keyed parts.

3. In a centrifugal extractor, a curb, a supporting member suspended within said curb, a basket rotatably mounted on said member, a motor mounted on said curb, means for coupling said motor to said basket comprising motion transmitting means concentric with said basket, other motion transmitting means mounted on said member and a connection between said motor and said other motion transmitting means comprising an extensible shaft having a universal joint, said extensible shaft consisting of two parts slidably keyed together and rolling anti-friction means therebetween.

4. In a centrifugal extractor, means for supporting a basket for rotational and lateral movement within a casing, comprising a frame swingably suspended from said casing, a pulley mounted on said frame, and an extensible driving shaft universally connected to said pulley.

5. In apparatus for transmitting power, in combination, a universal coupling comprising a spider member, a sleeve on said spider member provided internally with a longitudinally extending keyway, a shaft having an end mounted within said sleeve and slidable with respect thereto in an axial direction, and a spline formed on said shaft end adapted to co-operate with said keyway to transmit rotary motion between said spider member and said shaft.

6. In apparatus for transmitting power, in combination, a universal coupling comprising a spider member, a sleeve on said spider member provided internally with a longitudinally extending keyway, a shaft having an end mounted within said sleeve and slidable with respect thereto in an axial direction, a spline formed on said shaft end adapted to co-operate with said keyway to transmit rotary motion between said spider member and said shaft, and anti-friction means mounted between said spline and said keyway.

7. In apparatus for transmitting power, in combination, a universal coupling comprising a spider member, a sleeve on said spider member provided internally with a plurality of longitudinally extending keyways, a shaft having an end mounted within said sleeve and slidable with respect thereto in an axial direction, and a plurality of splines formed on said shaft adapted to co-operate with said keyways to transmit rotary motion between said spider member and said shaft.

8. In apparatus for transmitting power, in combination, a universal coupling comprising a spider member, a sleeve on said spider member provided internally with a plurality of longitudinally extending keyways, a shaft having an end mounted within said sleeve and slidable with respect thereto in an axial direction, a plurality of splines formed on said shaft adapted to co-operate with said keyways to transmit rotary motion between said spider member and said shaft, a plurality of rotatable bearings interposed between the co-acting faces of said splines and said keyways, and cage members for spacing said rotatable bearings longitudinally of said sleeve.

9. In an extractor, a curb, a supporting member suspended from said curb, a basket rotatably mounted on said member, motor means mounted on said curb, means for coupling said motor means to said basket, including motion transmitting means mounted on said member and a longitudinally extensible shaft connection between said motor means and said transmitting means, said connection comprising a longitudinally flexible universal joint.

10. In combination, a frame, a base member supported by said frame for oscillatory movement, a first shaft carried by said member, a second shaft supported independently of said member upon said frame, means for interconnecting said shafts comprising a shaft interposed between said first mentioned shafts and connected thereto by means of a pair of universal joints, one of which joints is slidably keyed to one of the shafts with which it cooperates, and rolling means for preventing friction between said slidably keyed parts.

In testimony whereof, I have signed my name to this specification this 7th day of September, 1929.

LE ROY C. SCHENCK.